Patented Nov. 7, 1933

1,934,216

UNITED STATES PATENT OFFICE 1,934,216

SULPHONATION OF BETA-NAPHTHOL

John M. Tinker, South Milwaukee, and Vernon A. Hansen, Milwaukee, Wis., assignors to E. I. du Pont de Nemours & Company, Wilmington, Del., a corporation of Delaware No Drawing. Application March 21, 1932
Serial No. 600,370

8 Claims. (Cl. 260—155)

This invention relates to a process for sulphonating beta-naphthol. More particularly, it deals with a process of converting beta-naphthol into 2-naphthol-1-sulphonic acid.

It is an object of this invention to provide a process for producing 2-naphthol-1-sulphonic acid in high yield and great purity.

It is a further object of this invention to provide a process for manufacturing 2-napthol-1-sulphonic acid on a commercial scale with great economy and at lower cost than was possible by the hitherto known methods.

Other and further important objects of this invention will appear as the description proceeds.

2-naphthol-1-sulphonic acid has been manufactured in the art by reacting upon beta-naphthol with concentrated sulphuric acid (90-93%) at ordinary temperatures. The reaction, however, does not produce the desired product in high yield. Moreover, this method suffers from the disadvantage that the reaction mass assumes a stiff, pasty form, which is difficult to handle.

Another method, well known in the art, involves the reaction with chlorosulphonic acid upon a solution of beta-naphthol in carbon disulphide. This method, however, is expensive, due to the very nature of the raw materials selected. Furthermore, carbon disulphide is a troublesome material to handle, due to its inflammability and the disagreeable and poisonous nature of its vapors.

Recently two methods have been suggested which involve the treatment of beta-naphthol, suspended in nitro-toluene, with chlorosulphonic acid, oleum, or a solution of sulphur trioxide, in nitro-toluene or nitro-benzene.

We have now found that beta-naphthol may be converted into 2-naphthol-1-sulphonic acid, with a high degree of efficiency and economy, by suspending beta-naphthol in an organic solvent therefor, such as tetrachlorethane, and passing in sulphur trioxide gas, substantially free of sulphuric acid, directly into this solution. If desired, slight quantities of dehydrated boric acid may be added to the reaction mass. This process has several distinct advantages over the hitherto known processes, among which may be mentioned the simplicity of procedure, low cost of reactants and labor, high yield, and great purity of the product. It excels over the chlorosulphonic acid process by the lower cost of sulphur trioxide compared to chlorosulphonic acid. It is superior to the oleum process because of the greater facility of handling the reactants, and because of its higher yields. Also, our novel process is not seriously affected by slight deviations from the optimum conditions. It is, therefore, readily controllable to produce uniformly high yields in repeated practice of this process on a large scale.

The mechanism of the reaction is apparently as follows:

The sulphur trioxide apparently reacts with the hydroxyl group, producing an ester, probably according to the following equation:

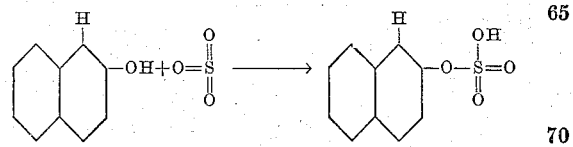

Then an intramolecular rearrangement of substituents takes place, probably in accordance with the following equation:

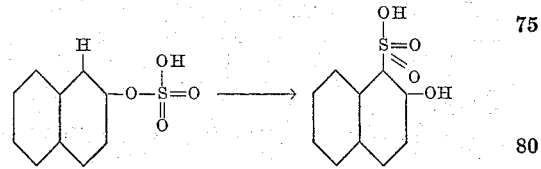

The temperature of the reaction mass may vary within wide limits, say between 0 and 40° C. In general, the lower temperatures are to be preferred, but they require a longer time of reaction. The optimum is therefore a compromise between low temperature and speed.

The calculated quantity of sulphur trioxide should be as nearly as possible that corresponding to theory, that is, one mole of sulphur trioxide: 1 mole of beta-naphthol. Although variations within 5% either way will produce no serious harm, they are nevertheless to be avoided. Excesses of sulphur trioxide gas have a tendency to produce disulphonic acids of 2-naphthol, which lower the yield of the main product. Similarly, deficient quantities of sulphur trioxide will lower the yield of 2-naphthol-1-sulphonic acid.

Without limiting our invention to any particular procedure, the following examples will serve to illustrate our process. Parts given are parts by weight.

Example 1

576 parts of beta-naphthol are suspended in 4000 parts of dry tetrachlorethane. 60 parts of boric acid (dried 24 hours in a vacuum at 110° C.) are added. Sulphur trioxide vapors are now passed into the mass at 20 to 25° C. while stirring, until 320 parts have been absorbed. The mass is then stirred for 12 to 16 hours longer, at room temperature.

3000 parts of water are now added, and the mass is well agitated. It is then allowed to settle into layers. The oily layer is separated and washed with cold water. It contains about 78 parts of beta-naphthol, and may be dried and reused for a subsequent batch.

The aqueous layer contains the 2-naphthol-1-sulphonic acid in solution, and may be used as such for many technical purposes, such as the preparation of 2-naphthylamine-1-sulphonic acid.

If a purer product is desired, the above aqueous solution (3500 parts) may be salted out with 550 parts of potassium chloride, and cooled. The crystalline mass is then filtered off, and contains 775 parts of highly pure 2-naphthol-1-sulphonic acid containing little, if any, isomers. The yield is about 85%, based on the quantity of beta-naphthol consumed.

*Example 2*

288 parts of beta-naphthol are suspended in 2000 parts of tetrachlorethane. 160 parts of sulphur trioxide gas, obtained by passing dry air through 60% oleum, are then blown in while maintaining the mass at about 0 to 5° C. The mass is then stirred overnight at room temperature; cold water is added, and the mass settled into layers and separated as in Example 1.

The aqueous solution may be further worked up as in Example 1, to give a high grade of 2-naphthol-1-sulphonic acid in good yield.

Instead of tetrachlorethane, any other organic liquid which is a solvent for beta-naphthol but inert toward sulphonation at the temperature used may be employed.

It will be understood that many other variations are possible in our preferred procedure without departing from the spirit of this invention.

We claim:

1. A process for preparing 2-naphthol-1-sulphonic acid, which comprises passing sulphur trioxide gas into a solution of beta-naphthol in an inert organic solvent.

2. A process for preparing 2-naphthol-1-sulphonic acid, which comprises passing sulphur trioxide gas into a solution of beta-naphthol in tetrachlorethane.

3. A process for preparing 2-naphthol-1-sulphonic acid, which comprises passing sulphur trioxide gas into a solution of beta-naphthol, in tetrachlorethane, at a temperature of about 0 to 40° C.

4. A process for preparing 2-naphthol-1-sulphonic acid which comprises passing sulphur trioxide gas into a solution of beta-naphthol in tetrachlorethane, at a temperature of about 20–25° C. and maintaining the mass at this temperature for about 12 to 16 hours.

5. The process which comprises suspending substantially 576 parts of beta-naphthol in 4000 parts of tetrachlorethane, passing into this mass at a temperature of 20–25° C., 320 parts of sulphur trioxide gas, free from sulphuric acid, and maintaining the mass at about room temperature for about 12 to 16 hours.

6. A process for preparing 2-naphthol-1-sulphonic acid, which comprises passing sulphur trioxide gas into a solution of beta-naphthol in an inert organic solvent in the presence of boric acid.

7. A process for preparing 2-naphthol-1-sulphonic acid, which comprises passing sulphur trioxide gas into a solution of beta-naphthol in tetrachlorethane in the presence of boric acid.

8. The process which comprises suspending substantially 576 parts of beta-naphthol and 60 parts of dehydrated boric acid in 4000 parts of tetrachlorethane, passing into this mass at a temperature of 20–25° C., 320 parts of sulphur trioxide gas, free from sulphuric acid, and maintaining the mass at about room temperature for about 12 to 16 hours.

JOHN M. TINKER.
VERNON A. HANSEN.